United States Patent [19]

Dewan et al.

[11] Patent Number: 4,511,956

[45] Date of Patent: Apr. 16, 1985

[54] POWER INVERTER USING SEPARATE STARTING INVERTER

[75] Inventors: Shashi B. Dewan, Toronto, Canada; Graham R. Adams, Boaz, Ala.

[73] Assignee: Park-Ohio Industries, Inc., Shaker Heights, Ohio

[21] Appl. No.: 325,750

[22] Filed: Nov. 30, 1981

[51] Int. Cl.³ .................. H02P 1/04; H02P 13/20
[52] U.S. Cl. .................. 363/49; 219/10.77; 363/71; 363/79
[58] Field of Search .................. 363/36, 37, 49, 71, 363/79, 136; 219/10.77

[56] References Cited

U.S. PATENT DOCUMENTS

| 3,290,581 | 12/1963 | Hooper | |
|---|---|---|---|
| 3,328,596 | 6/1967 | Germann | |
| 3,506,907 | 4/1970 | Porterfield et al. | 219/10.77 |
| 3,599,078 | 8/1971 | Pelly et al. | |
| 3,657,634 | 4/1972 | Eastop | 219/10.77 |
| 3,718,852 | 2/1973 | Bailey | 219/10.77 |
| 3,725,768 | 4/1973 | Pelly | |
| 3,725,770 | 4/1973 | Bailey | |
| 3,757,197 | 9/1973 | Bailey | 219/10.77 |
| 3,823,362 | 7/1974 | Bailey | 219/10.77 |
| 4,039,926 | 8/1977 | Steigerwald | 363/138 |
| 4,047,092 | 9/1977 | Bendzsak | 363/135 |
| 4,114,010 | 9/1978 | Lewis | 219/10.77 |
| 4,195,233 | 3/1980 | Udvardi-Lakos | 363/49 |
| 4,244,015 | 1/1981 | Beebe | 363/8 |
| 4,245,291 | 1/1981 | Tsutsui | 363/68 |
| 4,247,890 | 1/1981 | Cutler et al. | 363/137 |
| 4,253,140 | 2/1981 | McMurray | 363/96 |
| 4,258,416 | 3/1981 | Walker et al. | 363/137 |
| 4,275,438 | 6/1981 | Stirniman | 363/136 |
| 4,280,038 | 7/1981 | Havas et al. | 219/10.77 |
| 4,286,315 | 8/1981 | Johnson | 363/87 |
| 4,293,905 | 10/1981 | Opal | 363/124 |
| 4,296,462 | 10/1981 | Gurr | 363/96 |
| 4,312,031 | 1/1982 | Kudar | 363/41 |
| 4,323,958 | 4/1982 | Nowell | 363/28 |
| 4,323,959 | 4/1982 | Check | 363/40 |
| 4,325,112 | 4/1982 | Otsuka | 363/42 |
| 4,352,156 | 9/1982 | Gyugyi | 363/163 |
| 4,353,112 | 10/1982 | Rietvelt et al. | 363/16 |
| 4,355,351 | 10/1982 | Schwarz | 363/9 |
| 4,356,544 | 10/1982 | Ono et al. | 363/132 |
| 4,364,109 | 12/1982 | Okado et al. | 363/41 |

FOREIGN PATENT DOCUMENTS

| 1079363 | 6/1980 | Canada. | |
|---|---|---|---|
| 2530465 | 1/1977 | Fed. Rep. of Germany | 363/71 |
| 720638 | 3/1980 | U.S.S.R. | |

OTHER PUBLICATIONS

B. R. Pelly, "Latest Developments in Static High Frequency Power Sources for Induction Heating", IEEE Transactions on IECI, vol. IECI-17, No. 4, pp. 297-312, Jun. 1970.

Zhao et al, "A Thyristor Inverter for Medium Frequency Induction Heating," IEEE Transactions on 1AS, vol. 1AS81:38A, pp. 962-965, (Oct. 5-9, 1981).

Electronics, pp. 119-126, Jun. 13, 1966.

Primary Examiner—William H. Beha, Jr.
Attorney, Agent, or Firm—Body, Vickers & Daniels

[57] ABSTRACT

A method and apparatus are provided for an improved power inverter circuit, including a separate starting inverter having an A.C. output applied across a load prior to energizing the main inverter, and driven by a series of repeating gating signals. On achieving a preselected load condition, the starting inverter is removed from the circuit and the main power inverter is energized.

41 Claims, 14 Drawing Figures $t_{OFF}(1,2,\cdots N) > R \mu s$

| | |
|---|---|
| 1 | 24 VOLTS ON |
| 2 | STARTING INVERTER ON (UNITY) |
| 3 | MAIN GATING CIRCUIT ON |
| 4 | MAIN PHASE CONTROL ON (MIN ∅) <br> ($V_L > X+K$ STARTING INV. OFF) |
| 5 | RELEASE POWER REGULATOR |
| 6 | DISABLE START/STOP SEQUENCE |
| 7 | REDUCE PHASE ANGLE SCRs ON |
| 8 | REMOVE 24 VOLTS |

POWER INVERTER USING SEPARATE STARTING INVERTER

The present invention relates to the art of induction heating and more particularly to an improved power inverter and method of operating the same for use in an induction heating or similar environment.

INCORPORATION BY REFERENCE

The present invention relates to an improved inverter and method of operating the same. For the purpose of background information, the following U.S. Letters Patents are incorporated by reference herein: U.S. Pat. Nos. 3,506,907; 3,599,078; 3,657,634; 3,718,852; 3,725,770; 3,757,197; 4,039,926; and 4,195,233.

BACKGROUND OF INVENTION

The invention relates to inverters in general and more particularly to an inverter for induction heating. Such an inverter supplies high frequency alternating current to the induction heating coil which forms a tank circuit that has varying electrical characteristics according to the material and size of the workpiece and the temperature of the workpiece being heated. The load in the induction heating installation has an inductive component, a capacitive component and a resistive component. Consequently, it is susceptible to frequency changes and presents a load that varies drastically. In recent years, there has been a substantial amount of work devoted to the development of a high power solid-state power supply for driving an induction heating load. Such devices generally convert D.C. current to an alternating current which flows through the load. One of the most common of these devices is a solid-state inverter having a constant current supplied from a D.C. source, which current is alternately switched through the load in different directions by two distinct sets of switching devices, generally SCR's. This type of solid-state device has been used in tandem with a power rectifier which converts available three phase alternating current into D.C. current. This D.C. current is then directed to the inverter which changes the direct current into a single phase alternating current of a controllable high frequency. Frequency of the inverter is controlled by the rate at which gating signals are provided to the SCR's. One form of such inverters is a parallel-compensated inverter which is attached to a constant current source and is well known in the induction heating art.

In order for the SCR's to be commutated to the OFF condition, it is necessary to apply a reverse voltage across the individual SCR's for a time which is referred to as the turn-off time of the SCR's or other switching devices. This switching time varies according to the particular type of switching device used. As the frequency increases, there is less time available for commutating the individual switching devices or SCR's. Consequently, with high frequency inverters of 1.0 KHertz and higher, relatively precise switching devices are required. Such devices are expensive. Indeed, commercial SCRs can not exceed a preselected high frequency when a large margin of safety is provided to assure turn-off time. Thus, as inverters of the type described above are used for high frequency heating, generally required in induction heating, the SCR's become expensive and there is a relatively low maximum frequency to be obtained without modifying the well known inverter circuits. For this reason, controlling the gating pulses or gating signals for the SCR's has been the subject of substantial developmental work. Gating is generally controlled by monitoring the phase relationship of the voltage and current through the load and then adjusting this relationship so that sufficient turn-off time is assured. This concept limits the versatility of the inverter, necessitates expensive SCR's, requires an expensive choke to assure continuous current flow and generally complicates the inverter circuit itself.

Another disadvantage of power inverters, which is especially serious when used for widely varying loads, is that such inverter for supplying an induction load is difficult to start. It is usually impossible to start the inverter by merely providing gating pulses to the SCR's in the inverter in a manner similar to the steady-state condition. At start up, there is no energy in the tuned load for commutating the thyristors or SCR's. This starting problem is further compounded when the load is spaced from the inverter so that substantial inductance is created by connecting leads between the inverter and the load. Because of these difficulties, a substantial amount of work has been devoted to providing an arrangement for starting a power inverter used in the induction heating art. Circuits have been suggested for causing initial current oscillation through the load during the starting cycle. Some circuits involve switching of special capacitors across the load. Circuits have been provided to initially charge the tuned load to build up oscillations in the load before the gating of the inverter is started. Since this starting concept requires matching of an auxiliary circuit with the characteristics of the load, such concept could not be used for a wide range of load conditions. The most widely adopted concept is the provision of a smoothing inductor or reactor between the input D.C. supply and the thyristors or SCR's of the inverter. A precharging current is then directed through the inverter into the tuned load to shock the load into oscillations when the SCR's are gated. This technique required a relatively large reactor between the rectifier and inverter which is expensive and substantially adds to the cost of the device. In addition, the characteristics of the load negated this concept as an effective means for allowing start-up of a power inverter of the type used in induction heating.

THE INVENTION

The disadvantages discussed above and others are overcome by the present invention which is directed to an improved inverter of the type that can be operated substantially above 1,000 Hertz and can be used for widely varying loads, as experienced in induction heating.

In accordance with the present invention there is provided an improvement in a power inverter for converting a D.C. current into an alternating current having a frequency controlled by the rate at which a series of gating signals are created, this inverter includes control means for selectively energizing the power inverter, a first branch to be connected across a load, a second branch to be connected across the load, first switching means for applying a voltage of a first polarity across the load by the first branch, second switching means for applying a voltage of a second polarity across the load by the second branch and means for alternately operating the first and second switching means by the series of gating signals. The improvement is the provision of a starting inverter having a D.C. input and an A.C. output with a frequency controlled by a series of repeating gating commands. An arrangement for selectively applying the A.C. output of the starting inverter across the load is provided so that means responsive to the existence of a given condition across the load can be used for energizing the main power inverter and the de-energizing the auxiliary starting inverter. In practice, a constant current source is directed to the inverter; therefore, the switching devices actually apply a fixed current in alternate directions across the load; however, this switching action has the effect of creating a voltage across the load as defined in the general statement of the present invention. By employing this invention, the separate and distinct starting inverter may be relatively inexpensive and can be used separately to activate the main inverter during the initial, or start-up condition. In accordance with this aspect of the invention, the frequency of the gating commands used in the starting inverter are controlled to produce generally unity power factor across the load. Thus, the auxiliary starting inverter itself can be a separate and distinct electrical device having relatively small components intended to drive the load at its resonant frequency. A variety of arrangements could be incorporated for creating this unity power factor for the auxiliary inverter; however, in accordance with another aspect of the invention, generally standard load voltage and load current sensing circuits, such as those shown in U.S. Pat. No. 3,718,852, are employed for adjusting the frequency of the starting inverter to the resonant frequency of the load. This is accomplished by shifting the time displacement of either the load current or load voltage by substantially 90°. Then the two waves are multiplied together. This produces a signal which is generally zero at unity power factor. This produced signal is used to control the frequency or the gating command in the starting inverter to adjust the frequency of the starting inverter to the resonant frequency of the load. Thus, irrespective of the load conditions, the starting inverter operates at unity power factor. After unity power factor has been reached, the main inverter is turned on by adjusting the input rectifier or otherwise. This can be done by sensing the peak value of the load voltage or by waiting for a selected time, which can be defined as the starting cycle time. Thus, after the starting inverter has actuated the load at a unity power factor, the main inverter is actuated. Nearly contemporaneously therewith, the starting inverter is disconnected from the load. As is well known, the phase angle of the rectifier can be adjusted to increase the current to the main inverter. The starting inverter is proportioned so that it is approximately 5% of the nominal power generated by the main inverter during the heating operation. Consequently, the inverter is relatively small, can use inexpensive SCR's and need not be proportioned to have high power components.

In accordance with another aspect of the invention, there is provided an improved inverter of the type defined above, which inverter includes means for providing clocking pulses with a known frequency, means for sensing a wave transfer between adjacent segments of the line voltage at the start of a particular segment, i.e. a zero crossing, means for counting the pulses during the particular segment to produce a control count for a successive segment, means for subtracting from the control count a selected number to produce a gating number for the successive segment of the voltage wave, means for counting the pulses during the successive wave segment until reaching the gating number and means for creating a gating pulse when the gating number is reached during a successive voltage wave segment. In accordance with this aspect of the invention, the firing position in a given oscillation of the load voltage is controlled by the immediately previous oscillation or segment. In practice, this is the adjacent previous oscillation or wave segment. Thus, the gating of the main inverter is accomplished on a real time basis. The concept can be performed digitally. As indicated, only the load voltage wave is required to determine the gating signal time for the SCR's or thyristors in the main inverter. There is no need to monitor the load current for the purpose of controlling power factor to assist in maintaining proper turn-off time for the various SCR's. By using this gating or trigger concept, with or without the starting inverter concept, the choke or reactor between the rectifier and the main inverter can be reduced in size and cost. The inverter using this trigger concept can operate even with a discontinuous current condition at the input of the inverters. This greatly simplifies the operation of the inverter and prevents turn-off and damage to the inverters caused by discontinuous current operation and harmonics which can create false zero-crossing points for the load current wave.

In accordance with the above aspect of the invention, the gating pulses can be created in an analog circuit. Consequently, this aspect of the invention can be defined broadly as a circuit for creating repetitive gating signals for the switching devices of a D.C. to A.C. power inverter, which gating signals are created in timed relationship with respect to the load voltage wave having alternate positive and negative segments and directed across a load. The circuit in accordance with this broad aspect of the invention includes means for establishing a reference time when the voltage transfers between alternate wave segments and means for creating a gating signal a preselected time after this reference time. This can be done digitally or in an analog fashion.

The primary object of the present invention is the provision of an improved solid-state power inverter and method of operating the same, which improved inverter and method can be used in induction heating and can be operated over a wide variation of frequencies.

A further object of the present invention is the provision of an inverter and method, as defined above, which inverter and method can be operated at high frequencies, exceeding 1.0 to 10.0 KHertz.

Still a further object of the present invention is the provision of an inverter and method, as defined above, which inverter and method can use relatively inexpensive thyristors or SCR's and can use a relatively inexpensive connecting choke or reactor between the current supplying rectifier and the inverter itself.

Another object of the present invention is the provision of an inverter and method, as defined above, which inverter and method employ only the load voltage wave for controlling the firing or triggering time for gating the SCR's or thyristors.

Still another object of the present invention is the provision of an inverter and method, as defined above, which inverter and method can employ a smaller reactor or choke between the current supplying rectifier and the power inverter.

Yet another object of the invention is the provision of an inverter and method, as defined above, which inverter and method employ a separate and distinct starting inverter starting the main power inverter.

Still another object of the present invention is the provision of an inverter and method, as defined above, which inverter and method can be started by a relatively inexpensive circuit which is connected across the load itself to create unity power factor current flow in the load for the starting operation.

Another object of the present invention is the provision of an inverter and method, as defined above, which inverter and method controls trigger or gating times based upon an immediately previous swing of the load voltage. This can be done digitally and allows for accurate control of the gating time based upon current operating conditions of the inverter. The commutating time of the various SCR's can be assured without large built in safety factors. Also, it is not necessary to control the power factor to assure the necessary commutating time even at high frequencies.

Yet a further object of the present invention is the provision of a power inverter and method as defined above, which power inverter and method can function over a wide variation in power factor and even during discontinuous current conditions.

These and other objects and advantages will become apparent from the following description taken together with the drawings accompanying this disclosure.

BRIEF DESCRIPTION OF DRAWINGS

In this disclosure, the following drawings are incorporated.

PREFERRED EMBODIMENT

Figure 1:
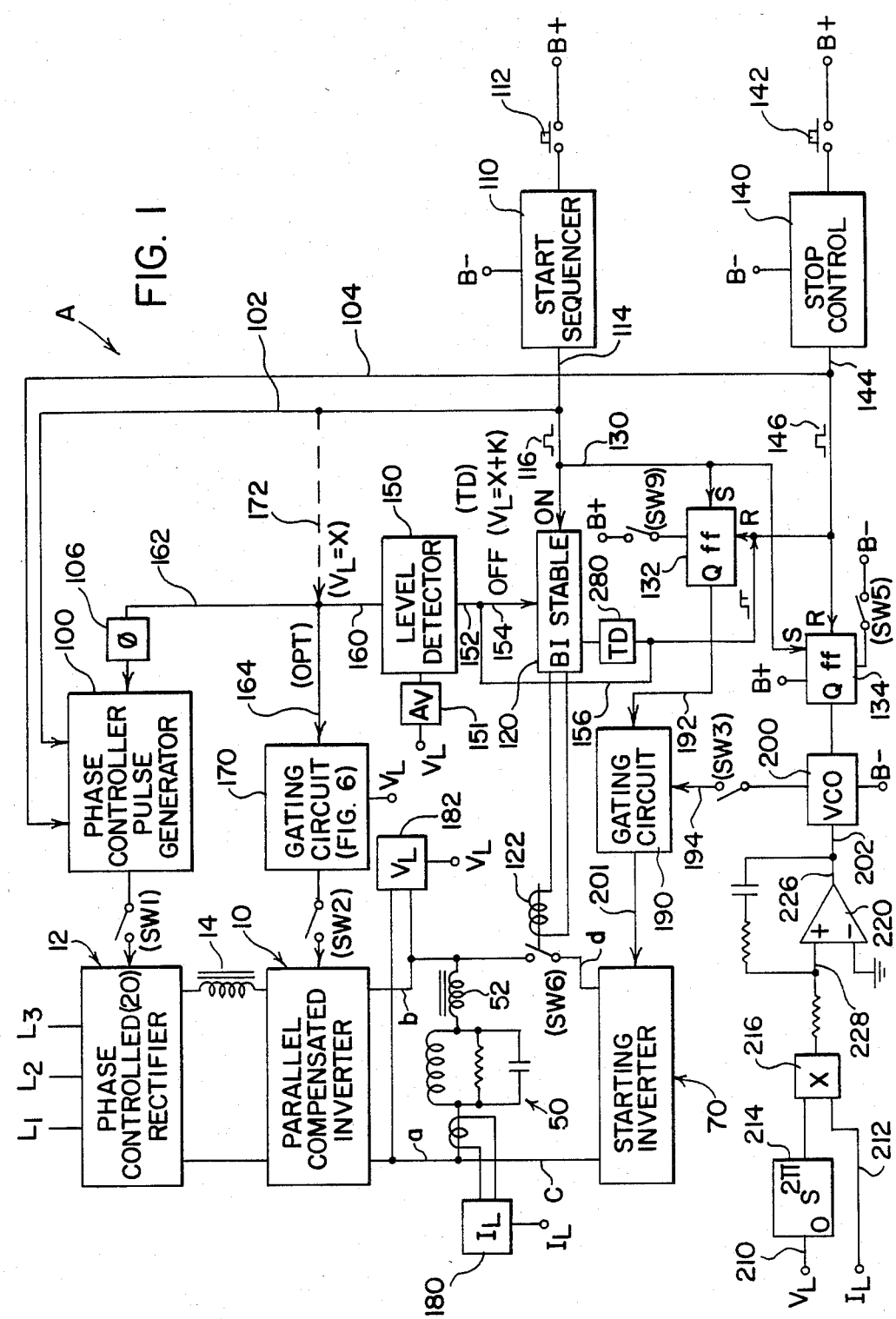
FIG. 1 is a combined wiring and block diagram illustrating the preferred embodiment of the present invention.
Figure 2:
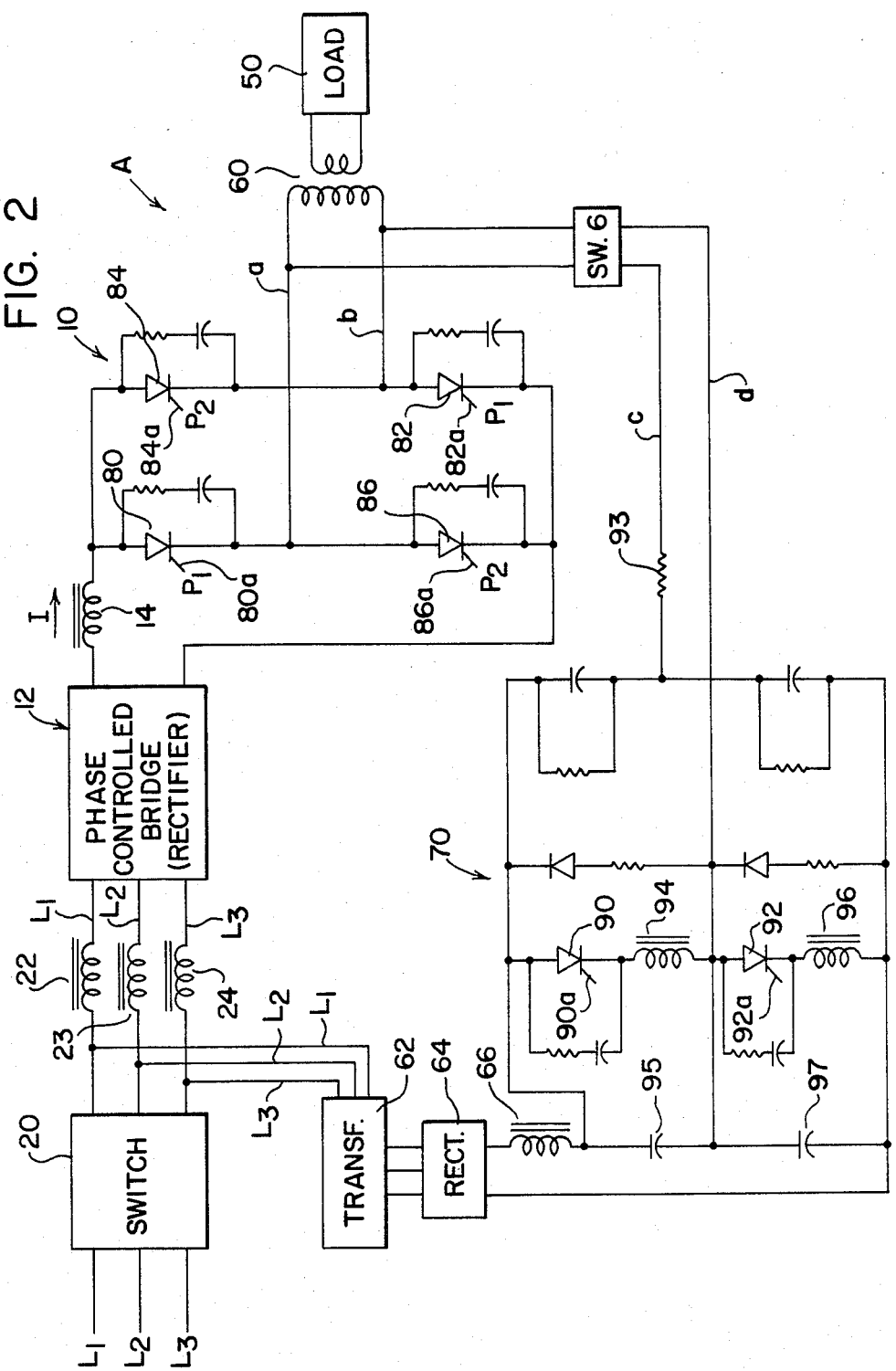
FIG. 2 is a wiring diagram showing in more detail certain features of the preferred embodiment as shown in FIG. 1.

Referring now to FIGS. 1 and 2, wherein the showings are for the purpose of illustrating the preferred embodiment of the invention only, and not for the purpose of limiting same, a parallel-compensated inverter 10 having outputs a,b are connected to a standard phase controlled rectifier 12. FIG. 1 is a detailed layout of the present invention including certain operating components utilized in the preferred embodiment. FIG. 2 is a similar overall view of the preferred embodiment showing primarily the interconnection between the various basic components as set forth in more detail in FIG. 1. These two figures are taken together to complete the description of the general layout of the various components employed in the preferred embodiment. In both figures, a choke or smoothing reactor 14 connects the constant current D.C. output of rectifier 12 to the input side of the somewhat standard parallel-compensated inverter 10. Rectifier 12 has a normal three phase input L1, L2 and L3 which can be connected or disconnected from the rectifier by an appropriate circuit breaker or switch network 20, shown generally in FIG. 2 and designated as a component of rectifier 12 in FIG. 1. In practice, line reactors 22, 23 and 24 are employed between circuit breaker 20 and phase controlled bridge or rectifier 12 to control the di/dt of the line current being rectified into a constant current D.C. source by bridge or rectifier 12. Output lines a,b are connected across an induction heating load 50 which is a parallel tuned circuit, or tank circuit, including inductance, reactance, and capacitance, as schematically illustrated in FIG. 1. A choke 52 is illustrated to represent the inductance in the leads to and from load 50. This inductance could be partially comprised of the inductance of load transformer 60 which is used in practice and is schematically illustrated in FIG. 2. As so far explained, inverter network A, shown in FIGS. 1 and 2, is constructed substantially in accordance with standard practice. A transformer 62, shown in FIG. 2, connects a second rectifier 64, through a choke 66, to the input side of a starting inverter 70, which auxiliary inverter forms one aspect of the present invention. Inverter 70 has output leads c,d to be connected across the load. Starting inverter 70 can be connected across the induction heating load by switch SW6 during the starting cycle of main inverter 10 in inverter network A. As can be seen in FIG. 2, inverter 70 is relatively simplified and includes only two SCR's 90, 92 and is proportioned to drive load 50 at its resonant frequency. The components of inverter 70 can be proportioned for low power and current operation. Main inverter 10 includes two separate branches, one of which is controlled by SCR's 80, 82 and the other of which is controlled by SCR's 84, 86. The SCR's, as shown in FIG. 2, include gates 80a, 82a, 84a, 86a, 90a, and 92a, respectively. A gating signal received by one of these gates renders the respective SCR conductive in accordance with standard practice. Each of these SCR's has a turn off time for commutating by reverse voltage. This turn off time is being reduced as technology involved in the construction of SCR's advances. At this time, the cut off time for the more expensive precision SCR's having rating necessary to carry the current needed for inducting heating is generally 9-12 microseconds. Thus, after a gating signal has been received by one of the gates, the SCR's can be turned off only by reverse biasing the SCR for a period exceeding 9-12 microseconds for more sophisticated SCR's. Less expensive SCR's used for power inverters have even greater turn off time and may require 50 to 100 microseconds of reverse voltage for commutating. To operate main inverter 10, gating pulses P1 are received in unison at gates 80a and 82a. Thereafter, SCR's 80, 82 are reverse biased to commutate when gating pulses P2 are directed to gates 84a, 86a to activate or render conductive SCR's 84, 86. By alternating gating signals P1, P2, an alternating current is created at transformer 60 for driving induction heating load 50. This is in accordance with standard solid-state and induction heated technology.

In accordance with the present invention, switch SW6 is closed during initial start-up of main inverter 10. When this occurs, gating commands are alternately received by gates 90a, 92a which causes an alternating current to flow through lines c, d to transformer 60 for driving load 50. Since inverter 70 is a small inverter having a power rating approximately 5% of the power rating for main inverter 10, inverter 70 is easy to start and can be positively driven to resonant frequency of load 50. This provides sufficient energy in the load to commutate inverters 80–86 to initiate operation of main inverter 10. Reactors 94, 96 are coupled together and combine with capacitors 95, 97 to commutate the SCR's. A single resistor 93 in line C is a current limiting element to prevent a short circuit between lines c,d. As previously mentioned, inverter 70 is low power and is adapted for the function of driving load 50 at its resonant frequency. In practice, inverter 10 has a rating of 200 Kw and starting inverter 70 is sized for approximately 5-15 Kw.

Referring now to the detailed block diagram of network A as shown in FIG. 1, a standard phase control 100 is employed for controlling the output of rectifier 12. This controller can be turned on by a signal in line 102 and can be turned off by a signal in line 104. In this manner, rectifier 12 can be activated or deactivated. When activated, constant current is applied to main inverter 10. Otherwise, no current or very low current is applied and inverter 10 does not operate. In practice, lines 102, 104 are employed for operating circuit breaker 20, as illustrated in FIG. 2. Another technique used for controlling the output of rectifier 10 is a phase angle adjustment device 106. As the phase angle is changed, the amount of power directed from rectifier 12 to inverter 10 can be controlled. Thus, by changing the phase angle by a control device well known in the art, the power from rectifier 12 can be progressively increased or decreased. This can be used instead of circuit breaker 20 for actually connecting rectifier 12 to inverter 10. In practice, inverter network A includes a start sequence device 110 actuated by switch 112 which may be a manual switch or a transistor switch. Upon actuation of switch 112, output 114 of sequence device 110 is provided with an appropriate start pulse 116. This pulse is employed for activating rectifier 12 by a pulse in line 102. Even though activated, device 106 is at a sufficient phase angle to prevent immediate application of power to inverter 10. Pulse 116 also initiates bistable device or one shot device 120 which is used to immediately connect leads c,d across load 50 so that inverter 70 is enegized and directs its output across induction heating load 50. To do this, relay coil 122 is energized to close switch SW6 in lines c,d, as shown in FIG. 2, or in line d as shown schematically in FIG. 1. In practice, both leads are connected by switch SW6 across induction heating load 50. Starting pulse 116 appears in line 130 which sets flip-flops 132, 134. The first flip-flop activates the gating circuit 190 for inverter 70 and the second flip-flop activates a voltage controlled oscillator 200 to control the spacing of the gate commands to SCR's 90, 92. The current from rectifier 64 is alternated across load 50 in accordance with a rate which will render the load voltage and load current in phase, i.e. at unity power factor.

To stop main inverter 10 of inverter network A, a stop sequence device 140 is controlled by an appropriate switch 142. Output line 144 receives a stopping pulse 146 to initiate the termination of operation of inverter 10. This stopping pulse turns off rectifier 12 through controller 100 by creating a pulse in line 104. In a like manner, pulse 146 resets flip-flops 132, 134 so that the gating circuit 190 of inverter 70 is deactivated as is the voltage controlled oscillator 200 used for spacing the gating pulses to SCR's 90. 92. In summary, sequencer 110 actuates network A by first conditioning rectifier 12 to supply constant current to inverter 10 and then by activating starting inverter 70 for starting main inverter 10 in a manner which will be described in more detail. To stop operation of inverter 10 in network A, sequencer 140 is energized by a system schematically represented as a single pole switch 142. This deactivates rectifier 12 to deactivate inverter 10. If starting inverter 70 is being used to start the main inverter when switch 142 is closed, flip-flops 132, 134 are reset to stop the operation of auxiliary inverter 70. If main inverter 10 is operating in a steady-state condition, switch SW6 is opened by releasing coil 122 and the stop sequence is employed only to remove power from inverter 10. As will be explained later, it is possible to direct power from rectifier 12 to inverter 10 without using the inverter for driving load 50 by disabling the network used in creating gating pulses P1, P2. Thus, main inverter 10 can be activated by selectively controlling the output of rectifier 12 or by controlling the gating pulse to the main inverter. In practice, both of these devices are employed for the purpose of controlling the actuation and deactuation of main inverter 10.

An appropriate level detector 150, which in practice is an operational amplifier, compares the average load voltage from a detector 151 with a preselected voltage level or reference represented as X. When the average voltage across the load reaches a preselected value, a signal is created within output line 152. This changes the logic on line 154 to clamp one-shot device or bistable device 120 to the OFF position. This opens switch SW6. At the same time, line 156 resets flip-flops 132, 134 to deactivate starting inverter 70 which has been released from load 50 by opening switch SW6. Thus, when the voltage across load 50 reaches a preselected level, inverter 70 is disconnected from the load and the starting inverter is deactivated by flip-flops 132, 134. A corresponding signal is created in output 160 of level detector 150. This creates a logic in 162 which progressively increases phase angle adjustment by device 106 to progressively apply more power from rectifier 12 to main inverter 10. At the same time, the logic on line 160 creates a signal in line 164 to energize gating circuit 170 for main inverter 10. As previously mentioned, this is optional and the gating circuit may be energized by sequencer 110 and need not wait for the operation of auxiliary inverter 70 before the gating signals are available and awaiting increased power from rectifier 12. The option of turning on gating circuit 170 by sequencer 110 is schematically illustrated by dashed line 172.

In many power inverters prior to the present invention, the load current and load voltage were detected and compared so that this comparison could be used to adjust the load phase angle to a preselected power factor. This preselected power factor was determined by the operating frequency of the inverter and the turn off characteristics of the SCR's or thyristors. The power factor was adjusted to assure that the SCR's were not subjected to a forward bias before they were commutated. Standard detectors 180, 182 are used in network A to perform the function of detecting the wave form of the load current and load voltage, respectively. In the present invention the output of detector 182 is directed to the input of gating circuit 170 to control the rate of the gating pulses. In the past, both current and voltage were generally employed for this function. By using the invention, gating pulses can be created while sensing only the load voltage wave from detector 182. The output of detector 182 is also employed by detector 151 for creating the average voltage across load 50 for use in energizing main inverter 10 after starting inverter 70 has performed its starting function.

Figure 10:
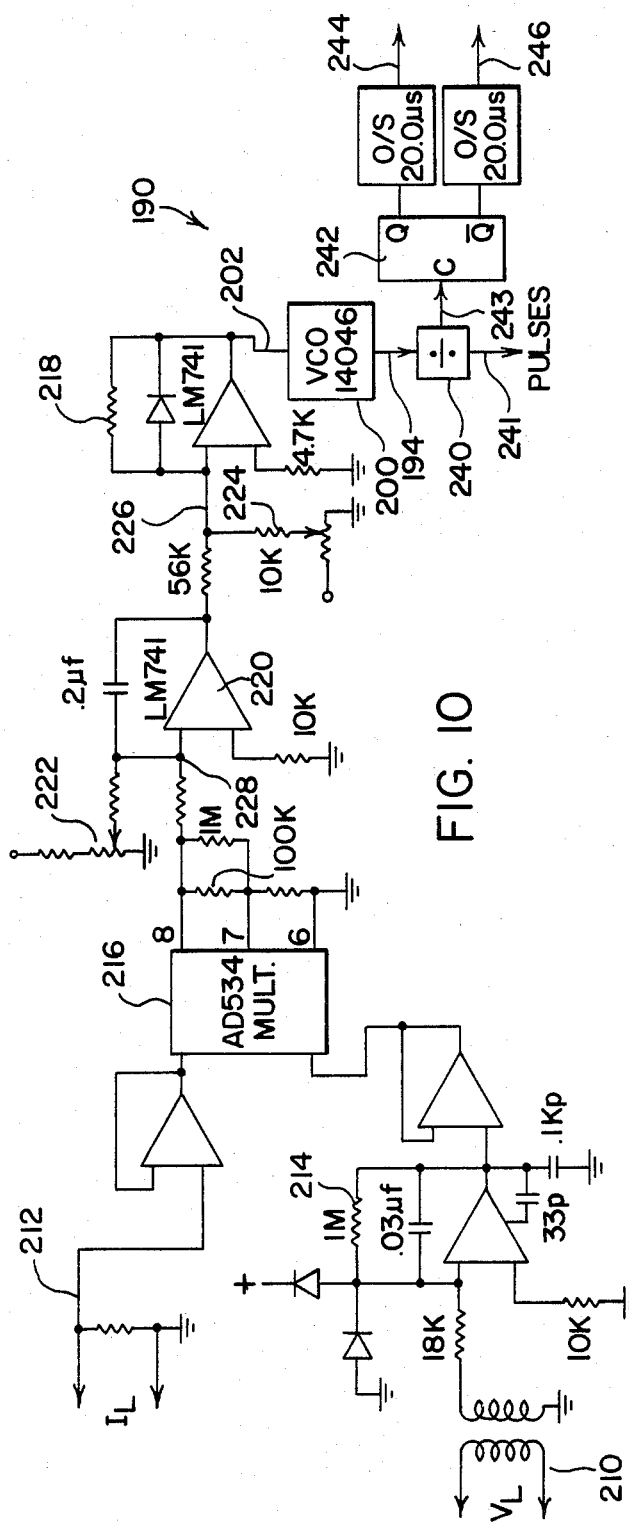
FIG. 10 is a wiring diagram illustrating the circuit employed in practice to control the power factor of the starting inverter during the starting cycle of the main power inverter as shown in FIG. 1.
Figure 12:
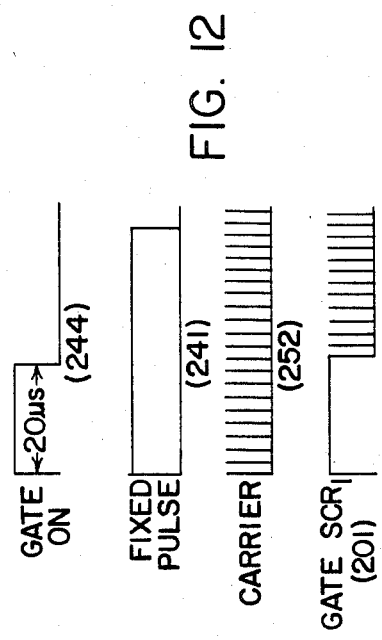
FIG. 12 shows a series of pulse charts indicating the output of FIG. 10 and the input of FIG. 11 as used to control the trigger or gating commands in the starting inverter of one aspect of the present invention.
Figure 11:
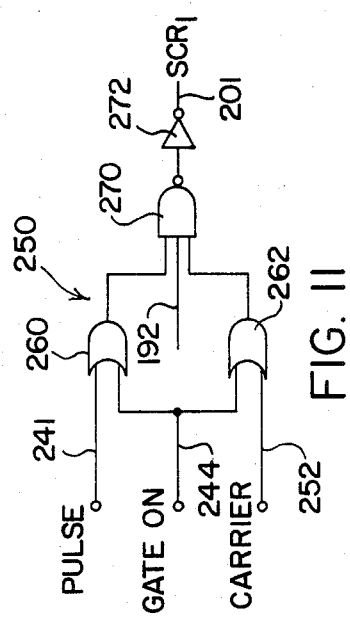
FIG. 11 is a logic diagram illustrating the arrangement for combining the output of the circuit shown in FIG. 10 to produce gating pulses.

During the starting cycle, which can be relatively short, auxiliary inverter 70 drives load 50 while main inverter 10 is not energized. To control the gating pulses to gates 90a, 92a, gating circuit 190, shown in more detail in FIGS. 10–12, is employed and is constructed in accordance with another aspect of the invention. Gating circuit 190 has a first input 192 which is the output of flip-flop 132. When this flip-flop is set, a logic 1 appears in input line 192 for enabling the gating pulses in a manner set forth in the network shown in FIG. 11. Another input 194 of circuit 190 is connected to the output of voltage control oscillator 200. The output of this oscillator is a variable frequency directed to line 194 to control the frequency of the gating commands in two lines 201, only one of these lines is illustrated in FIG. 1 and FIG. 11. The frequency of the gating pulses in lines 201 determines the frequency of voltage across leads c,d, which frequency is adjusted to the resonant frequency of load 50.

Figure 1A:
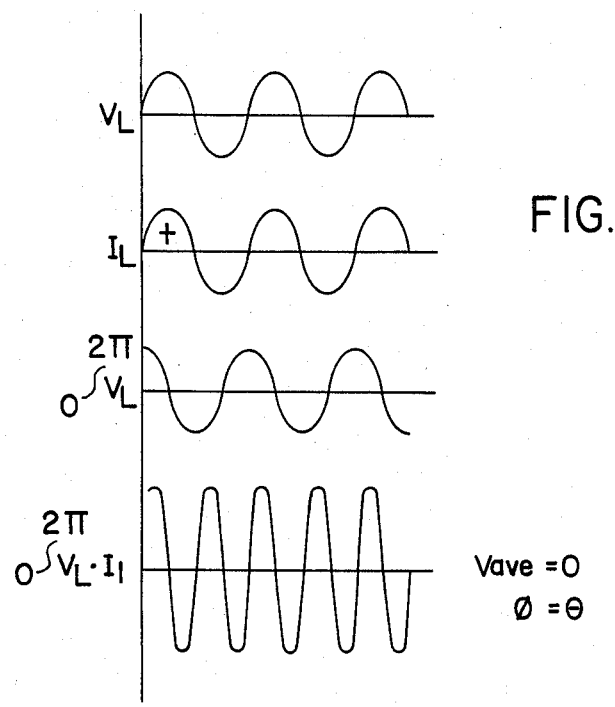
FIG. 1A is a series of wave charts indicating an operating characteristic of the preferred embodiment of the invention.

For the purpose of controlling the frequency in line 194 from oscillator 200, the voltage in input line 202 is controlled by the circuit best shown in FIG. 10 and schematically illustrated in FIG. 1. This circuit includes a voltage input 210 which has a sinusoidal wave shape, shown in the top graph of FIG. 1A. The current wave at input 212 has the wave shape generally shown in the second graph of FIG. 1A. In accordance with the present invention, one of these wave shapes is shifted 90°. In the illustrated embodiment, the load voltage wave at input 210 is shifted 90° by an integrator 214. The output of this integrator is multiplied by the current wave in line 212 by appropriate analog multiplier 216. The output of this multiplier is directed to amplifier 220, having output 226 controlling line 202 and an input 228 controlled by the analog level of the voltage from multiplier 216. As illustrated in FIG. 1A, when the load voltage and load current are in phase, the product of the integral of the load voltage and the load current is the wave shape shown in the bottom graph of FIG. 1A. This wave averages zero. Thus, the average output in line 228 is zero when the current and voltage of load 50 are in phase. At unity power factor, the average output of multiplier 216 is zero. Amplifier 220 has pots 222, 224 for controlling the voltage on line 226 so that the input to oscillator 200 has a preselected value when the output of multiplier 216 is averaged to zero. This circuit is shown in more detail in FIG. 10. A further amplifier 218 controls the voltage in line 202 as a function of the voltage in line 226. The output in line 194 controls the frequency of gating pulses to SCR gates 90a, 92a to produce unity power factor in operation of starting inverter 70.

Referring now more particularly to the detailed disclosure of FIGS. 10–12 which is directed to gating of SCR's 90, 92 of auxiliary inverter 70 for the purpose of maintaining unity power factor during the starting cycle, gating circuit 190 includes a frequency divider 240 having an output 241 which creates pulses having a duration during which one of the gates 90a, 92a is to be activated. The other output 243 controls a JK flip-flop 242 so that repetitive pulses in output 243 create series of 20.0 microsecond pulses in line 244, 246, alternately. These pulses each define the initial portion of a gating command to the particular SCR's 90, 92, as illustrated in FIG. 10. The pulses in line 241 and 244 for SCR 90 are illustrated in FIG. 12. An oscillator is employed for creating a carrier as shown in the bottom of FIG. 12. Gating network 250 for one of the SCR's, i.e. SCR 90, is shown in FIG. 11. This network includes the carrier input 252 together with a pulse input 241 and a gate input 244. The pulse input 241, carrier 252 is used for both SCR's. Network 250 is employed for SCR 90 because it receives the gating pulse in line 244. OR gates 260, 262 have outputs which control NAND gate 270. This NAND gate is enabled by a logic 1 in line 192, as shown in FIG. 1. When a pulse appears in line 241, NAND gate 270 is enabled so that the carrier pulses in line 252 can be directed through inverter 272 to gating line 201. When a signal appears in line 244, this produces a logic 1 in line 201. When this gate signal disappears after 20.0 microseconds, pulse 241 maintains a chain of pulses from carrier 252. Thus, during each gating command, there is a 20.0 microseconds constant gating signal and then a rapid succession of carrier pulses to maintain conduction. This gating signal is discontinued preparatory to commutating in accordance with standard practice.

The operation of starting inverter 70 is apparent from the previous description. In summary, inverter 70 is connected across load 50 by closing switch SW6. Gating circuit 190 controls pulses to gates 90a, 92a so that the voltage across load 50 is in phase with the current wave across the load. After this occurs, detector 150 energizes main inverter 10 and deenergizes starting inverter 70 by opening switch SW6 and changing the logic on line 192 and discontinuing the operation of oscillator 200. With load 50 being energized by inverter 70, main inverter 10 has sufficient energy to be operated in accordance with standard steady-state conditions. Operation of inverter 70 at the resonant frequency of load 50 simplifies the inverter and allows it to start rapidly and be constructed of relatively inexpensive components. As a safety factor, if the voltage from detector 151 is insufficient to actuate detector 150 for a preselected time, inverter 70 is disconnected by time delay device 280, shown in FIG. 1. This device is initiated upon receipt of a starting pulse 116 by bistable device 120. Time delay device 280 deactivates starting inverter 70 after a preselected time, which is greater than the expected starting cycle. This may be less than a few seconds. It is possible to bypass detector 150 and energize main inverter 10 by time delay device 280. In this manner, the starting inverter would be energized for a preselected time. Thereafter, main inverter 10 would be actuated and starting inverter 70 would be deactuated. This is an alternative arrangement which would employ time delay 280 which, in practice, is a safety device to assure that inverter 70 does not operate over prolonged periods when the load 50 has characteristics that will not allow unity power factor within the range of frequencies available from oscillator 200.

Figure 3:
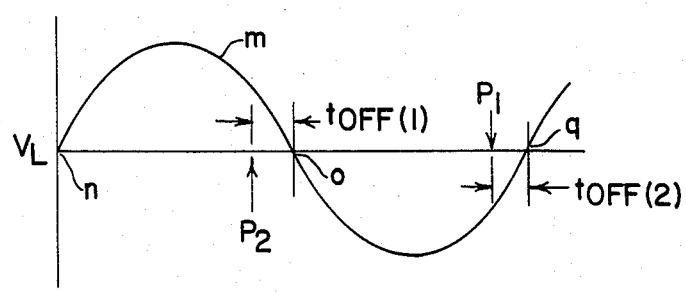
FIG. 3 is a graph illustrating, schematically, the load voltage during normal operation of the preferred embodiment of the present invention with certain operating characteristics set forth in graph form therebelow.
Figure 3:
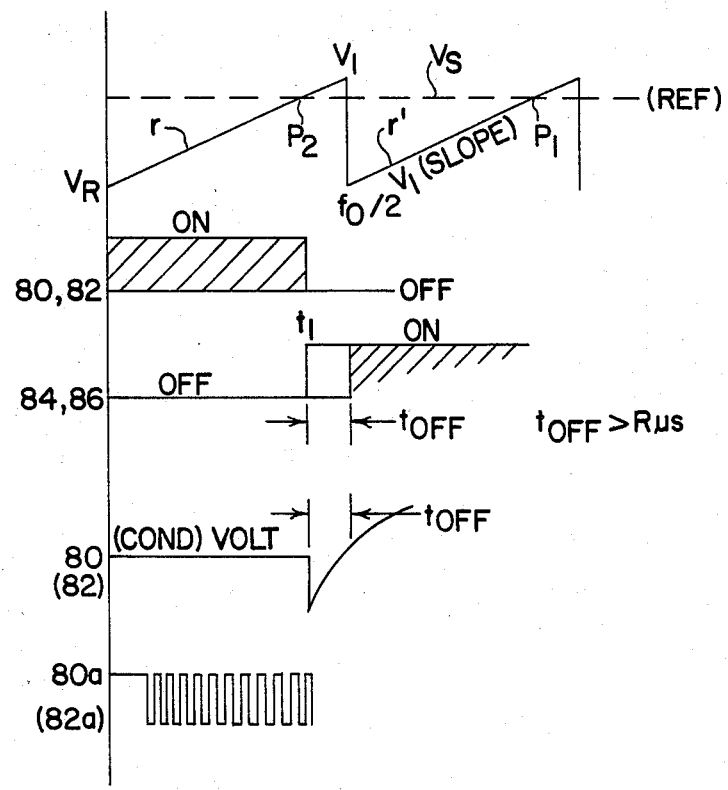
Figure 6:
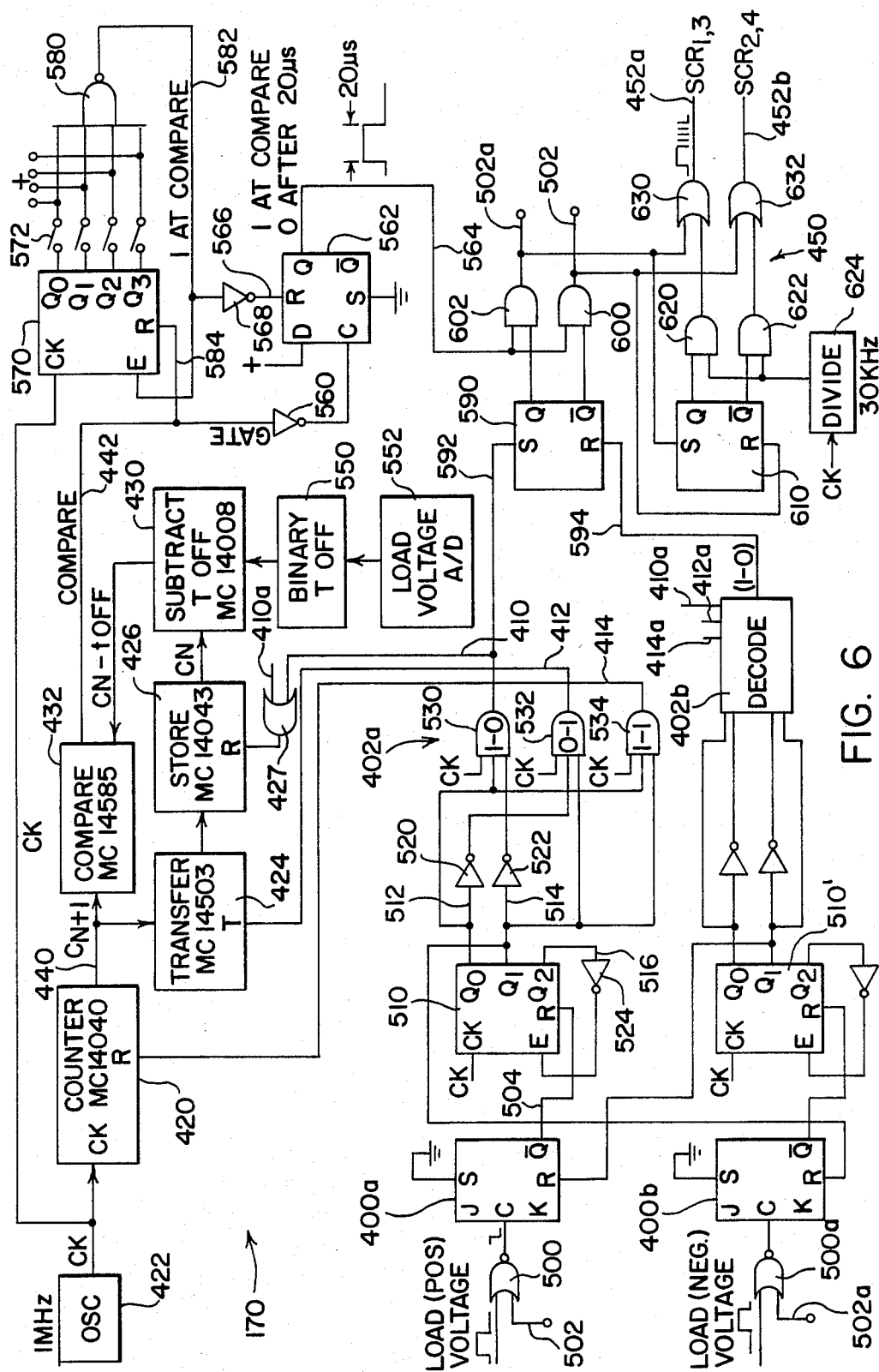
FIG. 6 is a combined wiring diagram and block diagram showing components employed in practice to accomplish the aspect of the invention set forth schematically in FIGS. 3–5.

Referring now to FIG. 3, the concept employed in FIG. 6 for controlling the time location of gating pulses P1, P2 for the SCR's in main inverter 10 is schematically set forth. Referring to the upper graph, the sinusoidal load voltage is illustrated as curve m. This wave passes through zero at points n, o and q. These are zero crossing points for curve m. Between zero crossing points n and o, there is one segment of curve m. During this segment, a gating pulse P2 occurs at a time spaced from the end of the segment (point o) a distance greater than the characteristic turn off time of SCR's 80–86. The object of the invention is to create pulse P2 for the first mentioned segment at a spacing tOFF(1) which is greater than the characteristic turn off time previously mentioned. Thus, pulse P2 occurs before zero crossing point o a sufficient time to allow commutating of SCR's 80, 82. During the next segment of curve m between zero crossing o and q, pulse P1 occurs before point q a distance tOFF(2). Each of these spacing times or amounts is greater than the characteristic commutating time of the SCR's which is set forth as R$\mu$s. To obtain minimum safe spacing for pulses P1, P2, it has been common practice to monitor both the load current and the load voltage to set the power factor at a desired value. In some instances, the phase relationship between the two wave shapes was measured and the rate of the gating pulses was modified according to the power factor. Thus, the gating circuit of the prior art has required a comparison of the load current and the load voltage. In accordance with the present concept, only the load voltage is monitored by circuit 170. To accomplish this advantage in an analog fashion, the concept set forth in the lower graphs of FIG. 3 is used. By detecting the zero crossing n of the load voltage, a capacitor is charged along line r. When this voltage reaches a reference voltage Vs, a gating pulse or pulses P2 are created. This energizes gates 84a, 86a which causes a reverse voltage to be applied across SCR's 80, 82. This reverse voltage is retained for a time determined by the location of pulse P2. By adjusting the slope of line r, the intersection between line r and the reference line Vs can be changed with respect to zero crossing n. By detecting the zero crossing o, the capacitor can be charged according to line r'. The slope of this line can be controlled by the end voltage $V_1$ of line 4. Thus, the voltage to which a capacitor is being charged along line r' can be controlled by the previous voltage $V_1$. The slope of line r is controlled by the immediately prior segment between zero crossing n,o. This control concept is repeated time after time during steady-state operation of main inverter 10. In each instance, the slope of line r' is controlled by the ultimate destination voltage $V_1$ of prior line r. The turn off time and spacing between a zero crossing point and the gating pulse can be accurately controlled based upon only the load voltage wave form. The existing frequency at any given time controls the position of the gating pulses. The bottom graph of FIG. 3 indicates that when one SCR is turned on, the carrier is supplied to the gate in accordance with the previous discussion of the gating pulse for starting inverter 70.

Figure 4:
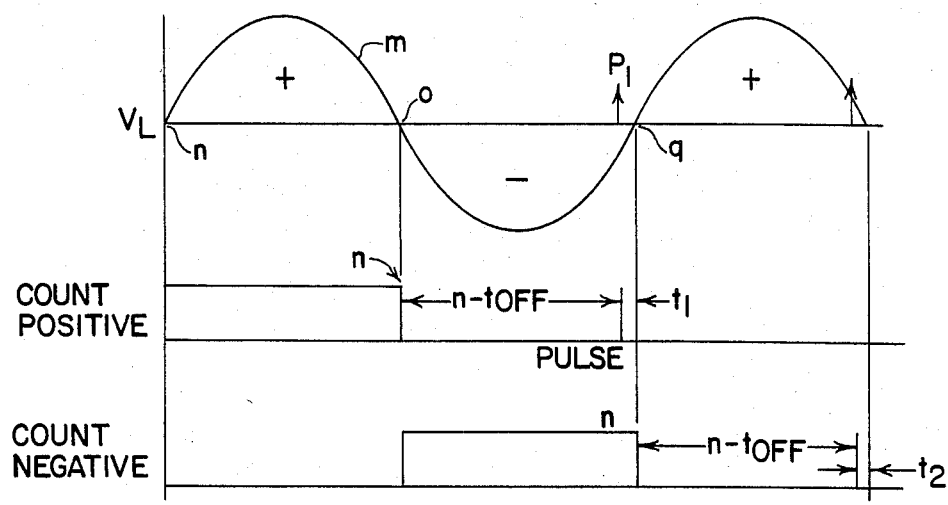
FIG. 4 is a graph similar to the graph shown in FIG. 3 and having a chart of certain characteristics used in an aspect of the present invention.
Figure 5:
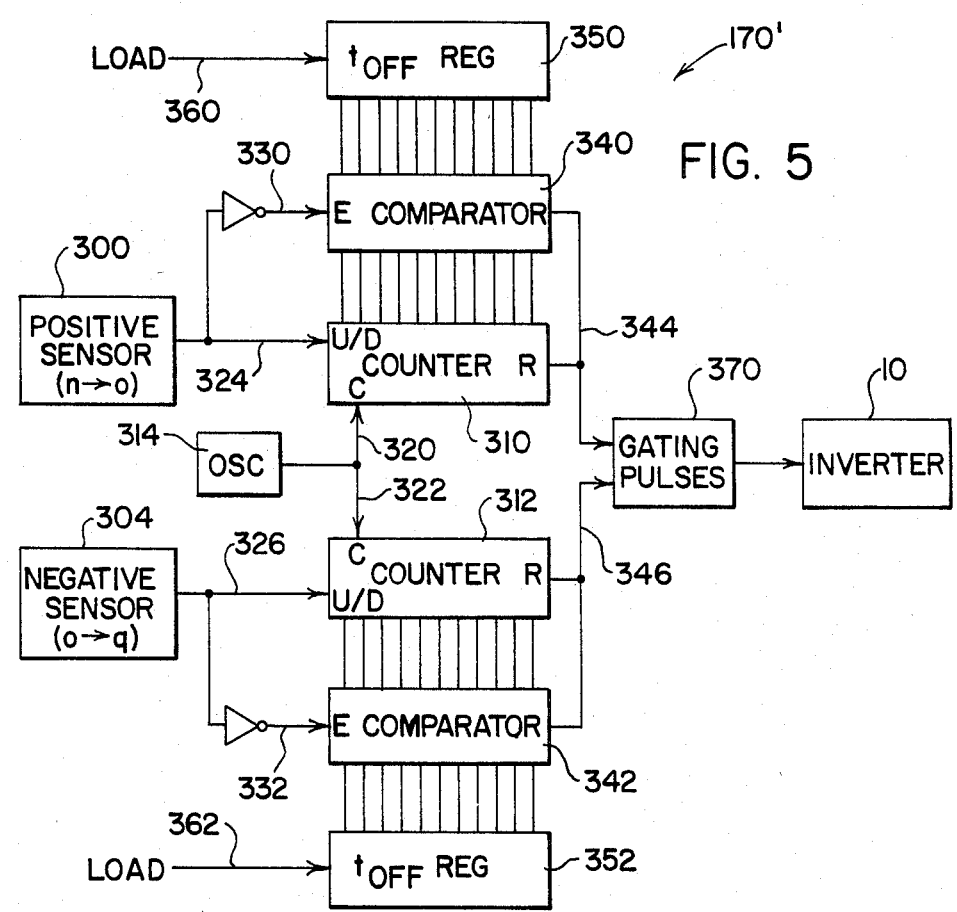
FIG. 5 is a schematic block diagram showing operating characteristics of the aspect of the present invention set forth schematically in FIG. 4.

The concept of employing a prior segment of wave m for creating the specific location of the next gating pulse, as set forth schematically in FIG. 3, is employed in gating circuit 170 as shown in FIG. 6. In this instance, a digital concept is used to memorize the length of the prior voltage segment and for controlling the next gating pulse based upon this memorized length. The concept is schematically illustrated in FIGS. 4 and 5. In FIG. 4, previously mentioned load voltage curve or wave m has zero crossings n, o, q, etc. Between each of these zero crossings is a segment which is one-half period of wave m. The alternate positive and negative segments of the load voltage wave m are designated with appropriate signs. In accordance with the digital implementation of the concept generally disclosed in FIG. 3, a counter counts pulses during the positive segment between zero crossings n, o. This creates a number n. The gating pulse P1 is to occur before zero crossing q during the negative segment between zero crossings o, q. To do this, previously generated count n is decremented by a number of counts indicative of a time t1 which counts are selected for an offset time greater than the turn off time of SCR's 80–86. The gating pulse is created after a time corresponding with counts n−t1. This creates a gating pulse P1. While the gating pulse P1 is being created, a further count is being made in the negative segment between zero crossings o, q. This produces a new number from which the preselected count is removed which count reduces the time of counts created during the negative segment to a time spacing t2. The time represented by the count difference or spacing exceeds the characteristic turn off time or commutating time of the SCR's. Thus, during each segment, a count of evenly spaced pulses is made. This count is memorized and then is used for establishing the instant for the next gating pulse. This can be done by subtracting a number of pulses or counts from the stored count or otherwise creating a gating signal when a preselected number of stored counts have been made. Since the end spacing is most critical, a subtractive concept is preferred because of the ease of obtaining the proper spacing before the crucial zero crossing of wave m.

Referring now to FIG. 5, a gating circuit 170' employing the concept set forth in FIG. 4 is illustrated. In this network, sensor 300 senses the time during which wave m is in a positive segment. A similar sensor 304 determines when the load voltage is in a negative segment. Up/down digital counters 310, 312 are employed for memorizing the number of counts during the positive segment of wave m and the negative segment of wave m, respectively. A common oscillator 314 creates a plurality of evenly spaced counting pulses in lines 320, 322 which count counters 310, 312, respectively, in the direction determined by logic in lines 324, 326, respectively. When sensor 300 is detecting a positive segment, line 324 causes counter 310 to count in the increasing or up direction. In a like manner, when sensor 304 is sensing a negative segment, line 326 causes counter 312 to count in the up direction. The rate of counting is determined by fixed oscillator 314. When counters 310, 312 are counting up or incrementing, lines 330, 332 each direct a logic 0 to the enabling terminal of comparators 340, 342, respectively. This prevents a comparison signal during the up counting mode of counters 310, 312. Comparators 340, 342 compare the digital output of registers 350, 352 with the digital output of counters 310, 312, respectively. Each of these registers is loaded with the count representing the spacing from zero crossing to provide necessary time at the end of a segment to allow commutating of one of the SCR's 80–86. This count is loaded in parallel fashion by lines represented by a single line 360, 362, respectively. Of course, registers 350, 352 could be combined since they will receive the same digital number from load line 360, 362.

In operation, counter 310 counts in a binary fashion the pulses or counts from oscillator 314. This upcounting is controlled by logic in line 324. When this logic shifts to a logic 0 indicating a zero crossing at the end of a positive segment of wave m, a logic 1 appears at line 330. This enables comparator 340. At the same time, line 324 causes counter 310 to count down or decrement in accordance with the rate of oscillator 314. When counter 310 reaches the number set in register 350, a pulse is created in compare line 344. This resets counter 310 and holds the counter in the reset condition. It also directs input to a one shot device 370 for creating gating pulses. These gating pulses are directed to main inverter 10 for gating the SCR's 80, 82. As soon as sensor 300 again detects a positive segment of wave m, the logic on line 324 shifts to a logic 0. This starts the upcounting of counter 310 and removes enable logic from comparator 340 so that the compare signal on line 344 disappears. This same operation is employed for creating pulses in line 346 when there is a comparison between count in counter 312 and the spacing count in register 352. By using this circuit, a prior segment determines the location in a timed relationship for each gating pulse or signal. This is a digital system to perform the analog concept set forth in FIG. 3.

Figure 6A:
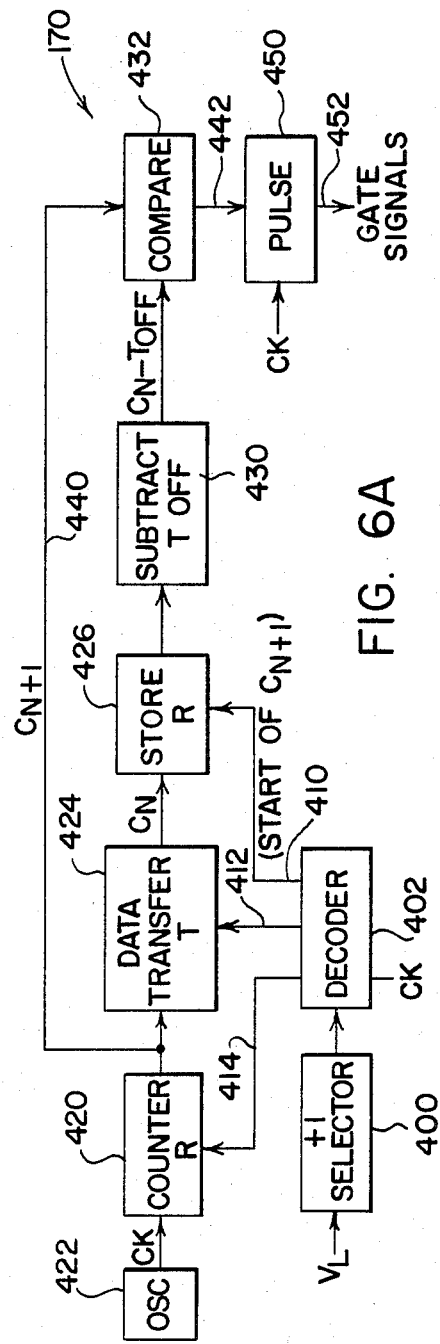
FIG. 6A is a simplified version of the circuit used in practice and as shown in FIG. 6.

In practice, gating circuit 170 is constructed to perform the function set forth in FIGS. 4 and 5 by the detailed circuitry shown in FIG. 6. Referring now specifically to FIG. 6A, a simplified version of the circuit in FIG. 6, a selector 400 determines whether or not line voltage wave m is in a negative or positive segment. Selector 400 is shown in more detail in FIG. 6 as flip-flops 400a, 400b. A decoder 402 produces a succession of pulses in lines 410, 412, 414 at the start of each segment to process counting information as described with respect to the scheme set forth in FIG. 5. Decoder 402 is shown as separate units 402a, 402b in FIG. 6. As soon as a zero crossing has been made, a series of pulses occur sequentially in lines 410, 412, 414, respectively. These pulses control processing of count information created primarily by counter 420 driven by a crystal controlled oscillator 422. In this instance, counter 420 counts only in a preselected direction which is, in practice, the up direction. A binary data transfer device 424 is connected in the parallel data mode to a binary storage device 426. When a zero crossing is detected by selector 400, a pulse occurs in line 410. This resets device 426 by gate 427. Immediately thereafter, on the next pulse, data transfer device 424 transfers the data from counter 420 into the cleared storage device. In the meantime, the reset pulse in line 410 has been removed.

Thereafter, a pulse in line 414 resets counter 420 to count the next wave segment. Thus, at the beginning of each segment, storage device 426 is cleared and the count occurring during the previous segment and appearing at the parallel outputs of counter 420 is transferred to storage device 426. A subtracting decoder 430 removes a preselected number of counts from the stored counts in device 426 by standard binary substraction so that comparator 432 has a first input which is a previous count $C_N$ minus tOFF which is compared with a current count indicated as $C_{N+1}$. As soon as there has been a comparison by binary comparator 432, a comparison signal is created in line 442. This activates the gating network 450 so that gating pulses appear in line 452. In FIG. 6, two lines 452a, 452b are employed for creating the gating pulses P1, P2 as set forth generally in FIG. 2. A previous count $C_N$ during a segment of load voltage wave m minus a sufficient number of counts ($T_{OFF}$) is compared with a current count $C_{N+1}$ from counter 420. When this comparison is made, a gating pulse is created.

Referring now to FIG. 6, gating circuit 170 as used in practice is illustrated. The various components are labeled according to their IC designation. The numbers employed in FIG. 6A are carried forward into FIG. 6. Selector 400a has an input gate 500 which is disabled by logic on line 502 at the initial portion of the gating signal for a positive segment. This prevents overlap in false counting by circuit 170. Selector 400a is a JK flip-flop having an output 504 connected to the reset terminal of a binary counter 510. This counter is counted by a 1.0 megahertz clock at its clocking terminal. Counter 510 has successive counting outputs 512, 514 and 516 each of which is connected to an inverter 520, 522, 524, respectively. In this manner, either inverted or non-inverted logic from the outputs of counter 510 can be employed by decoder 402a. In practice gates 530, 532 and 534 are used as the decoder. These AND gates are enabled by the previously mentioned clock CK for synchronization. When the reset pulse is removed from line 504 during actuation of flip-flop 400a, counter 510 starts counting. Gate 530 creates a pulse in line 410. Thereafter, gate 532 creates a pulse in line 412. Gate 534 then creates a pulse in line 414. These pulses have been previously described in connection with the block diagram shown in FIG. 6A. Selector 400b is essentially the same as selector 400a except it creates pulses in lines 410a, 412a, 414a which are ORed with lines 410–414. Input gate 500a is enabled or disabled by the logic on line 502a. This again is for the purpose of preventing overlap and assure operation of counter 510 in the proper sequence. Binary register 550 contains the count to be subtracted by unit 430 from the number stored in memory device 426. In practice, this binary register is adjusted automatically by an analog to digital inverter 552. As the average load voltage changes, the amount of counts subtracted from the previously stored count is varied. Although it can be done automatically, this function can be accomplished manually. After a compare signal has been created in line 442, this logic is inverted by inverter 560 to clock flip-flop 562 having an output 564. As soon as there is a compare signal, flip-flop 562 is clocked to create a logic 1 in line 564. After approximately 20.0 microseconds, a logic 1 in line 566 resets flip-flop 562 so that the logic in line 564 shifts back to a logic zero. Although various arrangements could be provided for resetting flip-flop 562, in practice, inverter 568 is interposed between the output of counter 570 and reset line 566. Counter 570 is counted in a binary fashion by pulses received from oscillator 422 when a logic 1 is applied to enabling terminal E. A plurality of switches for a network 572 enables various output terminals from counter 570. This network controls the logic on several inputs for NAND gate 580. Output 582 of this gate is connected to inverter 568 and enabling terminal E.

In operation, a logic 1 in line 584 occurs when there is a reset pulse or compare signal in line 442. This resets counter 570 to shift all terminals to a logic 0. Thus, at least one input of gate 580 is at a logic 0. This produces a logic 1 in line 582 for enabling clock 570 to count. This shifts reset line 566 to a logic 0. Consequently, flip-flop 562 can be clocked when a count selected by switch network 572 has been reached and a logic 0 appears in line 582. This resets flip-flop 562 to shift the logic on line 564 to a logic 0. At the same time, terminal E of counter 570 is disabled. By adjusting switch network 572 the width of the pulse in line 564 can be adjusted. This pulse creates a gating pulse in one of the lines 452a, 452b. The particular line which receives the gating pulse is determined by a steering flip-flop 590 set by the logic in line 592 and reset by the logic in line 594. Thus, the decoders 402a or 402b being operated controls the bistable flip-flop 590. The outputs of flip-flop 590 are directed to AND gates 600, 602 having outputs 502, 502a, respectively. Thus, flip-flop 590 enables one of the gates 600, 602 to steer the pulse in line 564 to an appropriate output line. Carrier flip-flop 610 is toggled according to the logic at the output of gates 600, 602. This controls the gates 620, 622 for directing a 30 KHertz carrier to the input side of one of the signal creating OR gates 630, 632. In this manner, flip-flop 590 activates one of the gates 630, 632. At first, a constant pulse of 20 microseconds is created at the output of the selected gate 630, 632. Thereafter, a series of pulses from divider 625 occur at the output of the selected gate. Thus, during gating, a constant pulse is created followed by a series of pulses. On activation of the other selector 400a 400b, flip-flop 590 is toggled to activate another one of the gates 630, 632. In this manner, gating pulses or signals are created in lines 452a, 452b for the purpose of controlling the SCR sets in main oscillator 10.

Figure 7:
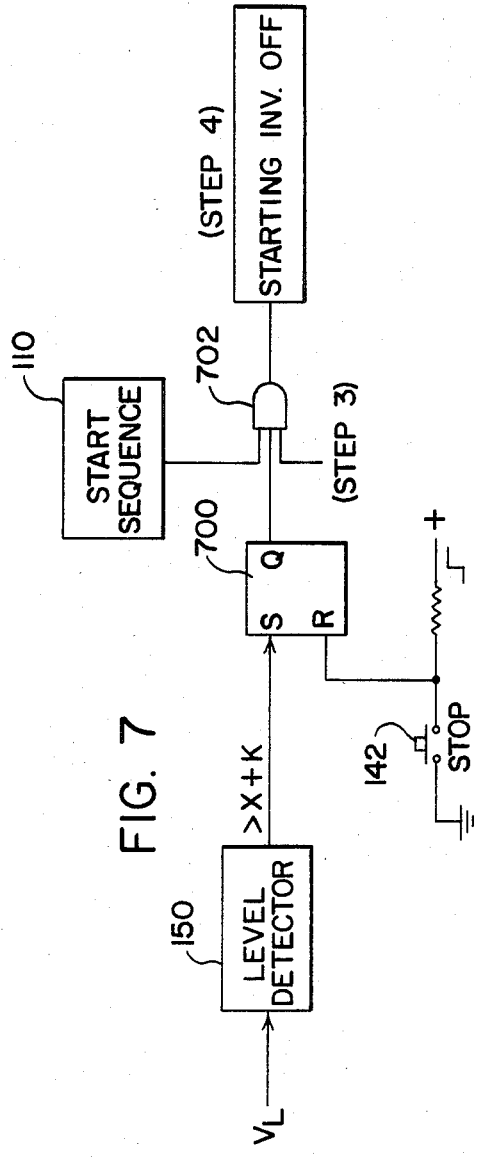
FIG. 7 is a combined block diagram and wiring diagram illustrating the arrangement employed in practice to discontinue operation of the starting inverter, as shown in FIGS. 1 and 2.
Figures 8, 9:
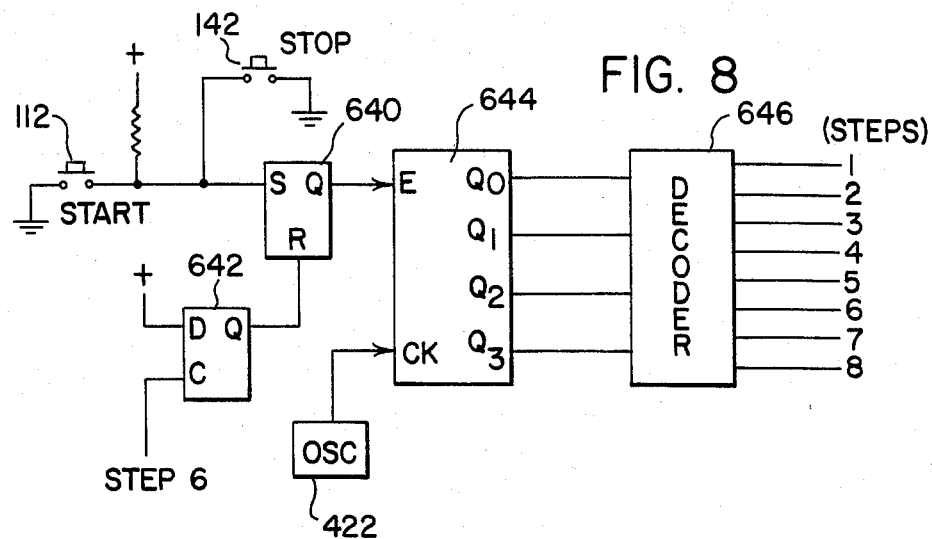
FIG. 8 is a combined wiring and block diagram showing a decoding arrangement employed in practice to perform the steps set forth numerically in FIG. 9.
FIG. 9 is a flow chart diagram showing the steps in the decoding arrangement employed in the control of the inverter network.

Referring now to FIGS. 7-9, a scheme employed in the preferred embodiment for controlling certain aspects of inverter network A is schematically illustrated even though they do not form a part of the present invention. Referring first to FIG. 8, a flip-flop 640 controls the binary counter 644 which has out-puts decoded to succesive steps by a decoder 646. Flip-flop 642 is employed for resetting flip-flop 640. In accordance with this schematic layout, neither the start button 112 or the stop button 142 is depressed, flip-flop 640 is set to enable counter 644. The counter then counts pulses from oscillator 422 to sequence through steps Nos. 1-8 at the output of decoder 646. The steps are as set forth in the chart of FIG. 9. At first, 24.0 volts is applied to inverter network A. Thereafter, the starting inverter 70 is activated by energizing bistable device 120. The starting inverter goes to unity power factor. Then, main gating circuit 170 is turned on by line 172. Then, step No. 4 shifts device 106 to a minimum phase angle so that rectifier 12 is at a minimum output. This is awaiting the operation of the starting inverter as previously described. Then, power regulator of network A is released and then during step No. 6 the clocking pulse is directed to flip-flop 642 to disable flip-flop 640. This stops counter 644 and holds decoder 646 at step No. 6. This is the starting sequence as set forth generally in the start sequencer block 110. To deactivate network A, steps No. 7 and No. 8 are processed by closing switch 142. The phase angle on control 100 is reduced and the 24.0 volts source is removed. Thus, step Nos. 1-6 are in the start sequence and steps Nos. 7 and 8 are in the stop sequence. Referring now to FIG. 7, flip-flop 700 is employed when start sequencer 110 is at step No. 3 As soon as level detector 150 detects a preselected level of output voltage, flip-flop 700 is set. This activates AND gate 702 which disconnects starting inverter 70 and applies power to inverter 10 by performing step No. 4. If during this routine, stop button 142 is energized, flip-flop 700 is reset to prevent advance into step No. 4. This concept is schematic in nature and is illustrated only to show that level detector 150 is employed in performing step No. 4 after step No. 3 has been performed.

Referring now to FIG. 1, several switches SW1-SW5 are illustrated. These switches are used in the preferred embodiment of the invention for the purpose of trouble shooting inverter network A. By opening these various switches, certain components can be disconnected to determine whether or not their particular function is causing difficulty being experienced by network A. These various switches are illustrated for the purpose of completeness; however, they are not necessary for the understanding and operation of the preferred embodiment of the invention.

Having thus described the invention, the following is claimed:

1. In a power inverter for converting a D.C. current into alternating current having a frequency controlled by the rate at which a series of gating signals are created, said inverter including control means for selectively energizing said power inverter, a first branch to be connected across a load, a second branch to be connected across said load, first switching means for applying a voltage of a first polarity across said load by said first branch, second switching means for applying a voltage of a second polarity across said load by said second branch and means for alternately operating said first and second switching means by said series of gating signals, the improvement comprising: a separated starting inverter having a D.C. input and a A.C. output with a frequency controlled by a series of repeating gating commands, means for selectively applying said A.C. output across said load until a preselected load condition exists, means for disconnecting said A.C. output of said starting inverter from said load in predetermined timed relationship with energizing said power inverter and wherein said energizing means include means to increase the power to said power inverter.

2. In a power inverter for converting a D.C. current into alternating current having a frequency controlled by the rate of which a series of gating signals are created, said inverter including control means for selectively energizing said power inverter, a first branch to be connected across a load, a second branch to be connected across said load, first switching means for applying a voltage of a first polarity across said load by said first branch, second switching means for applying a voltage of a second polarity across said load by said second branch and means for alternately operating said first and second switching means by said series of gating signals, the improvement comprising: a starting inverter having a D.C. input and a A.C. output with a frequency controlled by a series of repeating gating commands, means for selectively applying said A.C. output across said load until a preselected load condition exists and means responsive to the existence of said preselected load condition for energizing said power inverter and wherein said load condition is a preselected load voltage.

3. In a power inverter for converting a D.C. current into alternating current having a frequency controlled by the rate at which a series of gating signals are created, said inverter including control means for selectively energizing said power inverter, a first branch to be connected across a load, a second branch to be connected across said load, first switching means for applying a voltage of a first polarity across said load by said first branch, second switching means for applying a voltage of a second polarity across said load by said second branch and means for alternately operating said first and second switching means by said series of gating signals, the improvement comprising: a starting inverter having a D.C. input and an A.C. output with a frequency controlled by a series of repeating signals commands, means for selectively applying said A.C. ouput across said load until a preselected load condition exists, means for disconnecting said A.C. output of said starting inverter from said load in predetermined timed relationship with energizing said power inverter, means responsive to the existence of said preselected load condition for energizing said power inverter and wherein said load condition is a preselected load voltage.

4. The improvement as defined in claim 3 including means for detecting the voltage across said load, means for detecting the current flowing through said load and means for adjusting said repetitive gating commands until said voltage and current are generally in phase.

5. The improvement as defined in claim 4 wherein said adjusting means includes means for creating a control signal generally proportional to the phase displacement between said load current and said load voltage and means for changing said frequency of said repetitive gating commands in response to said phase displacement in a direction to decrease said phase displacement.

6. The improvement as defined in claim 5 wherein said means for creating a control signal includes means for integrating said alternating load voltage and means for multiplying said integrated load voltage with said load current to produce D.C. average voltage level; means for comparing said voltage level with a reference level; and, means for creating said control signal in response to said comparison.

7. The improvement as defined in claim 4 wherein said adjusting means includes means for integrating said detected load voltage, means for multiplying said integrated load voltage with said detected load current and means responsive to said product for adjusting said frequency of said repetitive gating commands.

8. The improvement as defined in claim 7 wherein said starting inverter includes two separate circuits for alternating current through said load and a single gate command responsive switching device in each of said circuits.

9. In a power inverter for converting a D. C. current into alternating current having a frequency controlled by the rate at which a series of gating signals are created, said inverter including control means for selectively energizing said power inverter, a first branch to be connected across a load, a second branch to be connected across said load, first switching means for applying a voltage of a first polarity across said load by said first branch, second switching means for applying a voltage of a second polarity across said load by said second branch and means for alternately operating said first and second switching means by said series of gating signals, the improvement comprising: a starting inverter having a D.C. input and a A.C. output with a frequency controlled by a series of repeating gating commands, means for selectively applying said A.C. output across said load until a preselected load condition exists, means for disconnecting said A.C. output of said starting inverter from said load in predetermined timed relationship with energizing said power inverter, means for detecting the voltage across said load, means for detecting the current flowing through said load, and means for adjusting said repetitive gating commands until said voltage and current is generally in phase.

10. The improvement as defined in claim 9 wherein said adjusting means includes means for creating a control signal generally proportional to the phase displacement between said load current and said load voltage and means for changing said frequency of said repetitive gating commands in response to said phase displacement in a direction to decrease said phase displacement.

11. The improvement as defined in claim 10 wherein said means for creating a control signal includes means for integrating said alternating load voltage and means for multiplying said integrated laod voltage with said load current to produce D.C. average voltage level; means for comparing said voltage level with a reference level; and, means for creating said control signal in response to said comparison.

12. The improvement as defined in claim 9 wherein said adjusting means includes means for integrating said detected load voltage, means for multiplying said integrated load voltage with said detected load current and means responsive to said product for adjusting said frequency of said repetitive gating commands.

13. In a power inverter for converting a D.C. current into alternating current having a frequency controlled by the rate at which a series of gating signals are created, said inverter including control means for selectively energizing said power inverter, a first branch to be connected across a load, a second branch to be connected across said load, first switching means for applying a voltage of a first polarity across said load by said first branch, second switching means for applying a voltage of a second polarity across said load by said second branch and means for alternately operating said first and second switching means by said series of gating signals, the improvement comprising: a separate starting inverter having a D.C. input and an A.C. output with a frequency controlled by a series of repeating gating commands, means for selectively applying said A.C. output across said load until a preselected load condition exists, means for detecting the voltage across said load, means for detecting the current flowing through said load and means for adjusting said repetitive said gating commands until said voltage and current is generally in phase.

14. The improvement as defined in claim 13 wherein said adjusting means includes means for creating a control signal generally proportional to the phase displacement between said load current and said load voltage and means for changing said frequency of said repetitive gating commands in response to said phase displacement in a direction to decrease said phase displacement.

15. The improvement as defined in claim 14 wherein said means for creating a control signal includes means for integrating said alternating load voltage and means for multiplying said integrated load voltage with said load current to produce D.C. average voltage level; means for comparing said voltage level with a reference level; and, means for creating said control signal in response to said comparison.

16. The improvement as defined in claim 13 wherein said adjusting means includes means for integrating said detected load voltage, means for multiplying said integrated load voltage with said detected load current and means responsive to said product for adjusting said frequency of said repetitive gating commands.

17. The improvement as defined in claim 13 wherein said starting inverter includes two separate circuits for alternating current through said load and a single gate command response switching device in each of said circuits.

18. In a power inverter for converting a D.C. current into alternating current having a frequency controlled by the rate at which a series of gating signals are created, said inverter including control means for selectively energizing said power inverter, a first branch to be connected across a load, a second branch to be connected across said load, first switching means for applying a voltage of a first polarity across said load by said first branch, second switching means for applying a voltage of a second polarity across said load by said second branch and means for alternately operating said first and second switching means by said series of gating signals, the improvement comprising: a starting inverter having a D.C. input and an A.C. output with a frequency controlled by a series of repeating gating commands, means for selectively applying said A.C. output across said load until a preselected load condition exists, means responsive to the existence of said condition for energizing said power inverter and wherein said load condition is average load voltage.

19. The improvement as defined in claim 18 including means for detecting the voltage across said load, means for detecting the current flowing through said load and means for adjusting said repetitive gating commands until said voltage and current are generally in phase.

20. The improvement as defined in claim 19 wherein said adjusting means includes means for creating a control signal generally proportional to the phase displacement between said load current and said load voltage and means for changing said frequency of said repetitive gating commands in response to said phase displacement in a direction to decrease said phase displacement.

21. The improvement as defined in claim 20 wherein said means for creating a control signal includes means for integrating said alternating load voltage and means for multiplying said integrated load voltage with said load current to produce D.C. average voltage level; means for comparing said voltage level with a reference level; and, means for creating said control signal in response to said comparison.

22. The improvement as defined in claim 19 wherein said adjusting means includes means for integrating said detected load voltage, means for multiplying said integrated load voltage with said detected load current and means responsive to said product for adjusting said frequency of said repetitive gating commands.

23. The improvement as defined in claim 19 including means for disconnecting said A.C. output of said starting inverter from said load in timed relationship with energizing said power inverter.

24. The improvement as defined in claim 19 wherein said starting inverter includes two separate circuits for alternating current through said load and a single gate command responsive switching device in each of said circuits.

25. In a power inverter for converting a D.C. current into alternating current having a frequency controlled by the rate at which a series of gating signals are created, said inverter including control means for selectively energizing said power inverter, a first branch to be connected across a load, a second branch to be connected across said load, first switching means for applying a voltage of a first polarity across said load by said first branch, second switching means for applying a voltage of a second polarity across said load by said second branch and means for alternately operating said first and second switching means by said series of gating signals, the improvement comprising: a separate starting inverter having a D.C. input and a A.C. output with a frequency controlled by a series of repeating gating commands, means for selectively applying said A.C. output across said load until a preselected load condition exists, means for disconnecting said A.C. output of said starting inverter from said power inverter, and wherein said load condition is a preselected time after applying said starting inverter across said load.

26. In a power inverter for converting a D.C. current into alternating current having a frequency controlled by the rate at which a series of gating signals are created, said inverter including control means for selectively energizing said power inverter, a first branch to be connected across a load, a second branch to be connected across said load, first switching means for applying a voltage of a first polarity across said load by said first branch, second switching means for applying a voltage of a second polarity across said load by said second branch and means for alternately operating said first and second switching means by said series of gating signals, the improvement comprising: a separate starting inverter having a D.C. input and A.C. output with a frequency controlled by a series of repeating gating commands, means for selectively applying said A.C. output across said load until a preselected load condition exists, means responsive to the existence of said conditin for energizing said power inverter, wherein said load condition is a preselected time after applying said starting inverter across said load; means for detecting a voltage across said load, means for detecting the current flow through said load and means for adjusting said repetitive gating commands until said voltage and current are generally in phase.

27. The improvement as defined in claim 26 wherein said adjusting means includes means for creating a control signal generally proportional to the phase displacement between said load current and said load voltage and means for changing said frequency of said repetitive gating commands in response to said phase displacement in a direction to decrease said phase displacement.

28. The improvement as defined in claim 27 wherein said means for creating a control signal includes means for integrating said alternating load voltage and means for multiplying said integrated load voltage with said load current to produce D.C. average voltage level; means for comparing said voltage level with a reference level; and, means for creating said control signal in response to said comparison.

29. The improvement as defined in claim 26 wherein said adjusting means includes means for integrating said detected load voltage, means for multiplying said integrating load voltage with said detected load current and means responsive to said product for adjusting said frequency of said repetitive gating commands.

30. The improvement as defined in claim 26 including means for disconnecting said A.C. output of said starting inverter from said load in timed relationship with energizing said power inverter.

31. The improvement as defined in claim 26 wherein said starting inverter includes two separate circuits for alternating current through said load and a single gate command responsive switching device in each of said circuits.

32. In a power inverter for converting a D.C. current into alternating current having a frequency controlled by the rate at which a series of gating signals are created, said inverter including control means for selectively energizing said power inverter, a first branch to be connected across a load, a second branch to be connected across said load, first switching means for applying a voltage of a first polarity across said load by said first branch, second switching means for applying a voltage of a second polarity across said load by said second branch and means for alternately operating said first and second switching means by said series of gating signals, the improvement comprising: a separate starting inverter having a D.C. input and an A.C. output with a frequency controlled by a series of repeating gating commands, means for selectively applying said A.C. output across said load until a preselected load condition exists, means for disconnecting said A.C. output of said starting inverter from said load in predetermined timed relationship with energizing said power inverter, means responsive to the existence of said condition for energizing said power inverter, and wherein said starting inverter includes two separate circuits for alternating current through said load and a single gate command responsive switching device in each of said circuits.

33. In a power inverter for converting a D.C. current into alternating current having a frequency controlled by the rate at which a series of gating signals are created, said inverter including control means for energizing said power inverter, a first branch to be connected across a load, a second branch to be connected across said load, first switching means for applying a voltage of a first polarity across said load by said first branch, second switching means for applying a voltage of a second polarity across said load by said second branch and means for alternately operating said first and second switching means by said series of gating signals, the improvement comprising: a separate starting inverter having a D.C. input and an A.C. output with a frequency controlled by a series of repeating gating commands means for selectively applying said A.C. output across said load until a preselected load condition exists and means for controlling the frequency of said gating commands to produce a generally unity power factor across said load.

34. The improvement as defined in claim 33 including means for disconnecting said A.C. output of said starting inverter from said load in timed relationship with energizing said power inverter.

35. The improvement as defined in claim 33 wherein said load condition is a preselected load voltage.

36. The improvement as defined in claim 33 including means for detecting the voltage across said load, means for detecting the current flowing through said load and means for adjusting said repetitive gating commands until said voltage and current are generally in phase.

37. A method of operating a power inverter of the type used in induction heating of a load and having a frequency controlled by the rate at which a series of gating signals are created, said method comprising the steps of:
(a) providing a separate starting inverter having an alternating current output with a frequency controlled by repetitive gating commands;
(b) connecting said output of said separate starting inverter across said load;
(c) energizing said connected starting inverter;
(d) adjusting said frequency of said repetitive gating commands to produce substantially a unity power factor across said load;
(e) maintaining said unity power factor from said starting inverter;
(f) energizing said power inverter after said starting inverter has been adjusted to unity power factor.

38. A method as defined in claim 37 wherein said power inverter is energized after a preselected time.

39. A method as defined in claim 37 wherein said power inverter is energized after the voltage across said load reaches a preselected value.

40. A method as defined in claim 37 wherein said adjusting step includes:
(g) detecting the load voltage to obtain a voltage wave;
(h) detecting the load current to obtain a current wave;
(i) shifting the time displacement of one of said waves by substantially 90°;
(j) multiplying said shifted wave with the non-shifted wave;
(k) comparing the product of said multiplication with a reference to produce a control signal; and,
(l) adjusting said frequency by said control signal.

41. The method as defined in claim 40 wherein said shifting is in a positive direction.

* * * * *